US006809693B2

(12) United States Patent
Andrews et al.

(10) Patent No.: US 6,809,693 B2
(45) Date of Patent: Oct. 26, 2004

(54) COMPACT ANTENNAS HAVING DIRECTED BEAMS AND POTENTIALLY MORE THAN ONE DEGREE OF FREEDOM PER CONCENTRATION REGION

(75) Inventors: Michael R. Andrews, Berkeley Heights, NJ (US); Partha Pratim Mitra, Summit, NJ (US); Alexander Polyakov, Brooklyn, NY (US)

(73) Assignee: Lucent Technologies Inc., Murray Hill, NJ (US)

( * ) Notice: Subject to any disclaimer, the term of this patent is extended or adjusted under 35 U.S.C. 154(b) by 142 days.

(21) Appl. No.: 10/306,811

(22) Filed: Nov. 27, 2002

(65) Prior Publication Data

US 2004/0100416 A1 May 27, 2004

(51) Int. Cl.[7] ............................ H01Q 21/00; G01S 3/02

(52) U.S. Cl. ......................... 343/725; 343/726; 343/853

(58) Field of Search ................................. 343/725, 726, 343/727, 728, 729, 876, 853, 730; H01Q 21/00; G01S 3/02

(56) References Cited

U.S. PATENT DOCUMENTS 6,195,064 B1 2/2001 Andrews et al.
6,317,098 B1 11/2001 Andrews et al.
6,646,615 B2 * 11/2003 Andrews et al. ............ 343/726

* cited by examiner

*Primary Examiner*—Hoanganh Le

(57) ABSTRACT

A compact antenna and a communication unit having the same comprises one or more input feeds and one or more sets of elements. Each set of elements is coupled to one or more of the input feeds, and each set of elements has a property that input signals applied to input feeds coupled to the set of elements causes a directed beam to be emitted. At least one given element of the set or sets of elements has a largest dimension, and a smallest wavelength to be emitted from the antenna is larger than the largest dimension for the given element. The antenna is adapted to simultaneously transmit the input signals, and generally more than two input signals. When a concentration region for a directed beam is large enough, more than one degree of freedom can be contained in the concentration region. Techniques are presented for designing the compact antenna.

26 Claims, 11 Drawing Sheets

COMPACT ANTENNAS HAVING DIRECTED BEAMS AND POTENTIALLY MORE THAN ONE DEGREE OF FREEDOM PER CONCENTRATION REGION

FIELD OF THE INVENTION

The present invention relates generally to communication over wireless channels, and more particularly, to antennas for communicating over wireless channels.

BACKGROUND OF THE INVENTION

Multiple-antenna communication, where multiple antennas are used for transmitters or receivers or both, has become popular because this type of communication can increase efficiency. In this context, "efficiency" usually refers to "spectral efficiency," a term describing how many bits can be communicated within a given bandwidth.

Multiple-antenna communication can take advantage of complex scattering environments. In such an environment, signals transmitted from one location can take many different paths before reaching a receiver with multiple antennas. Each antenna of the receiver effectively receives different copies of the same signals, because of the different paths the signals take to each antenna. Due to these multiple paths, a multiple-antenna system can use the different copies to reduce errors or increase transmitted information, both of which result in more efficiency.

Nonetheless, a multiple-antenna system can be complex to implement and can take relatively large amounts of space. This is particularly disadvantageous for those applications where smaller antennas are desired. A need therefore exists for techniques that enable and create smaller antennas that improve communication efficiency.

SUMMARY OF THE INVENTION

Aspects of the present invention provide compact antennas, communication units having the same and methods for designing the same. The compact antennas are adapted to emit one or more directed beams, with each directed beam having one or more degrees of freedom per concentration region in the directed beam.

In an aspect of the invention, a compact antenna is disclosed comprising one or more input feeds and one or more sets of elements. Each set of elements is coupled to one or more of the input feeds, and each set of elements has a property that input signals applied to input feeds coupled to the set of elements causes a directed beam to be emitted. A directed beam is a radiation pattern in which power is concentrated in a concentration region. A concentration region may be, for instance, a solid angle. Each element of the set or sets of elements has a largest dimension. At least a given element of a set of elements has a largest dimension smaller than a smallest wavelength to be emitted from the antenna. Additionally, the antenna is adapted to simultaneously transmit the input signals. Usually, more than two input signals are transmitted simultaneously. When a concentration region is large enough, more than one degree of freedom can be contained in the concentration region, meaning that more than one independent input signal may be emitted via the directed beam having the concentration region.

In another aspect of the invention, a communication unit comprises the antenna and signal processing circuitry. The signal processing circuitry comprises reception circuitry, transmission circuitry, or both. Illustratively, for transmission, multiple input signals can be combined and coupled to the one or more feeds of the antenna.

In yet another aspect of the invention, techniques for designing a compact antenna are presented. Such techniques include selecting a concentration region to be emitted from the antenna, where the concentration region is to be emitted in a directed beam. Concentration for the selected concentration region is determined and increased until the concentration reaches a predetermined concentration. Antenna geometry is defined in order to create the concentration region with the predetermined concentration. The step of defining creates one or more sets of elements and one or more input feeds.

Illustratively, one technique for designing a compact antenna then comprises determining multipole coefficients corresponding to the predetermined concentration, determining currents corresponding to the multipole coefficients, and determining antenna geometry suitable for creating the currents.

A more complete understanding of the present invention, as well as further features and advantages of the present invention, will be obtained by reference to the following detailed description and drawings.

DETAILED DESCRIPTION

Multiple antennas in scattering environments can increase spectral efficiency over-and-beyond what one would expect in free space. This is true because the randomness of the various paths the radiation can take from multiple transmission antennas to multiple reception antennas results in linearly independent sets of propagation coefficients. Otherwise, if the communication had taken place in free space, the fact that the distance between two parties is large compared to the geometric mean of their transceiving apertures means that all sets of direct-path coefficients are linearly dependent. In other words, the distance between two parties is large as compared to the size of each set of transmitting and receiving multiple antennas being used to communicate. So, linear independence is good for capacity, and indeed, information and random-matrix theories show that spectral efficiency scales with the degrees of freedom of the transmitter-to-receiver transformation at large signal to noise ratios.

It was previously believed that a single antenna in a non-scattering environment could have no more than two orthogonal polarization modes, which meant that at most two channels could be supported by an antenna. However, in rich scattering environments, a single antenna can support more than two orthogonal polarization modes. This is shown by U.S. Pat. Nos. 6,195,064 and 6,317,098, the disclosures of which are hereby incorporated by reference. These patents describe exemplary antennas supporting up to three orthogonal polarization modes.

In this disclosure, efficiency for antennas is described from another point of view, that of compact antennas that can efficiently encode degrees of freedom into directed beams. The compact antennas discussed herein can achieve close to six degrees of freedom in directed beams from electrically small sets of dipole moments formed via the compact antennas.

Figure 1:
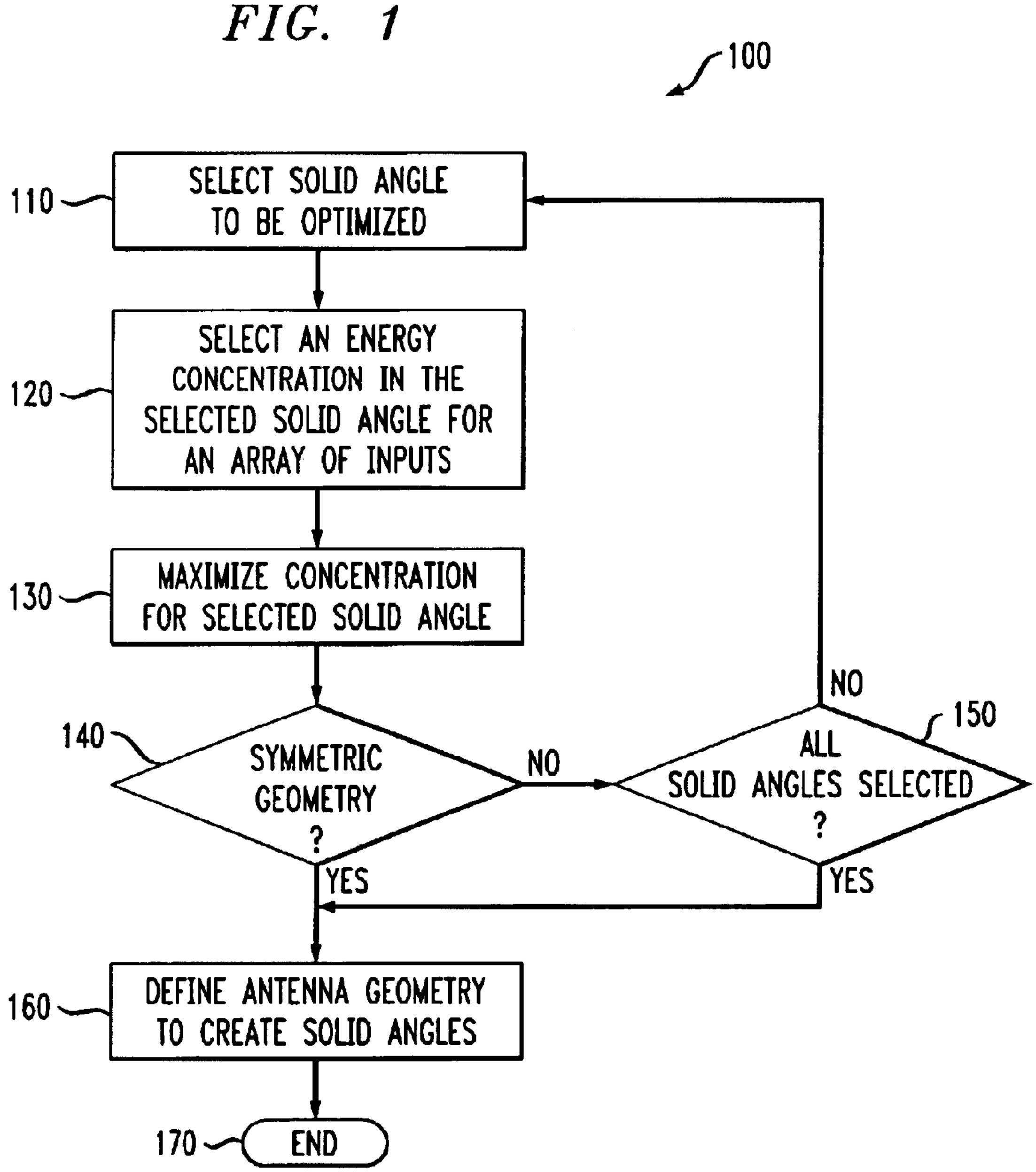
FIG. 1 is a flow chart of a method for designing compact antennas having directed beams and one or more degrees of freedom per concentration region, in accordance with a preferred embodiment of the invention.

Referring now to FIG. 1, an exemplary method 100 is shown for designing compact antennas having directed beams and one or more degrees of freedom per concentration region. A concentration region is any region where radiated power of the antenna meets a predetermined power. The predetermined power is generally relatively high as compared to overall transmitted power of the antenna. For many applications, a concentration region may be a solid angle. A solid angle defines a sub-region on a surface of a sphere, e.g., surrounding the compact antenna. A solid angle need not define a conical region demarcated by a circle on the sphere, although this is the usual case. A "compact" antenna comprises a number of sets of elements, where a set of elements is one or more elements and each set defines a concentration region. Each element has a maximum dimension. The smallest wavelength transmitted by the antenna is larger than each of the maximum dimensions of the elements. A compact antenna in general produces multiple directed beams. A directed beam is a radiation pattern in which power is concentrated in a concentration region. Therefore, input signals impressed into a directed beam will be radiated unequally in different directions. This is shown in more detail in reference to FIGS. 7 through 9. Additionally, each solid angle can be excited by multiple input signals. For instance, an antenna might radiate three solid angles, where one solid angle is excited by input signals 1, 2, and 3, the second solid angle is excited by input signal 4, and the third solid angle is excited by input signals 5 and 6.

Figure 6:
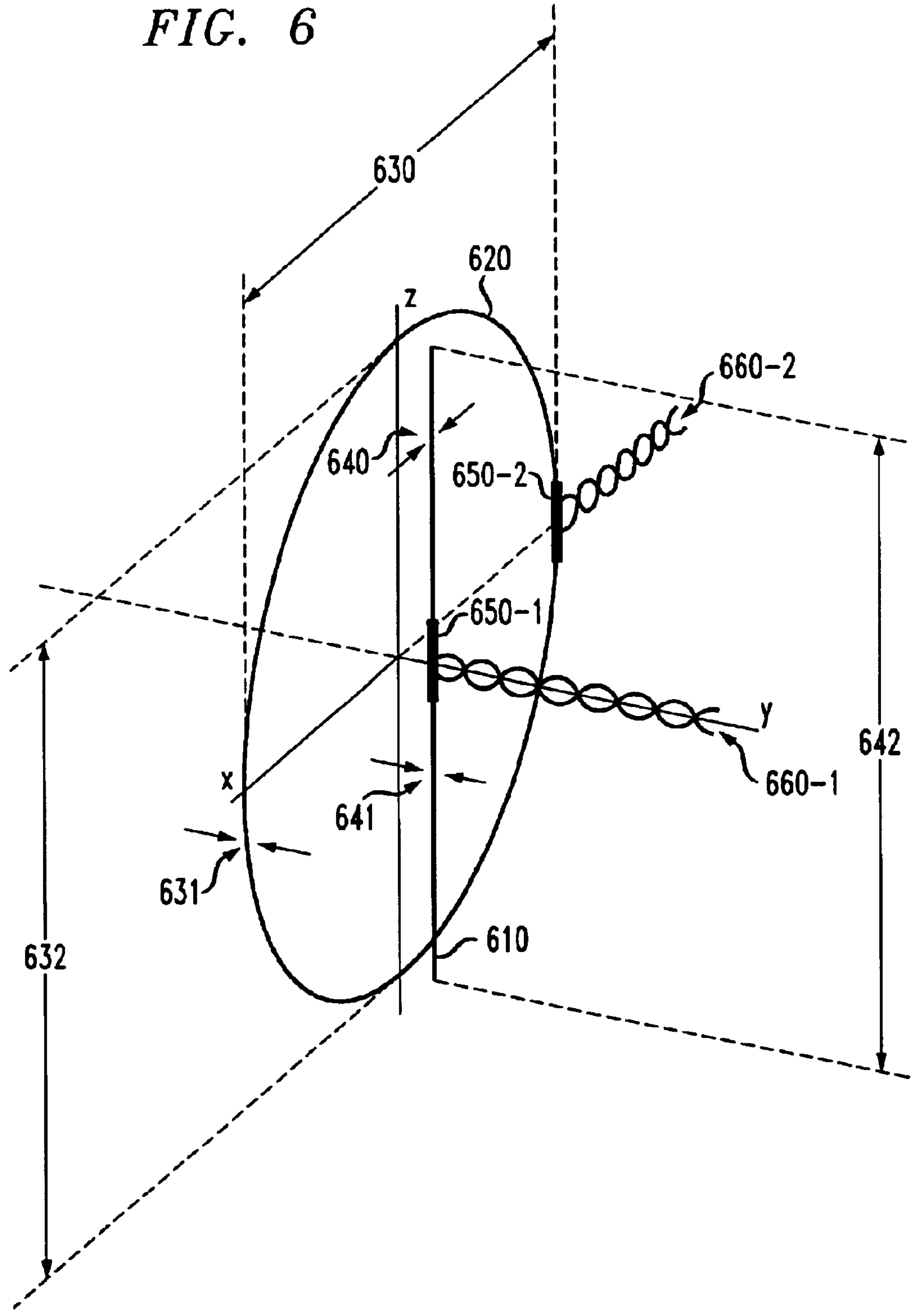
FIG. 6 is a diagram of an antenna that can be excited in such a way to confine radiation to approximately a $\frac{2}{3}\pi$ solid angle, in accordance with a preferred embodiment of the invention.

Method 100 and the examples given below will be described in terms of solid angles, although it should be noted that a concentration region may be used instead of solid angles. Method 100 begins in step 110 when a particular solid angle is selected to be optimized. One exemplary set of elements suitable for generating a directed beam having a particular solid angle is shown in FIG. 6. Generally, up to three solid angles will be defined by three sets of elements, although it is possible to define more or less than three solid angles. When the three sets of elements are symmetric, such that each of the sets is the same, then method steps 120 and 130 need only be performed once. It is assumed, when there is symmetry for three sets of elements, that all three sets will define three identical solid angles. If one or more of the sets are not symmetric, then method steps 120 and 130 are performed multiple times, once for each non-symmetric set.

In step 120, an energy concentration in the selected solid angle is selected for an array of feeds to a set. The array of feeds include, for instance, wired feeds or antenna feeds (e.g., apertures) or both. One exemplary way to perform step 120 is to express a desired radiated power in terms of multipole coefficients of a current distribution caused by the set of elements. A mathematical expression for radiated power is given below.

In step 130, the concentration is maximized by optimizing over the antenna geometry for the sets of elements being examined. A mathematical technique for maximizing the concentration is given below.

It should be noted that when a solid angle is made large enough, more than one degree of freedom can be contained in the solid angle. This means that more than one independent input signal can be contained in the beam emitted in the solid angle. Degrees of freedom, concentration, and solid angles are described in more detail below.

In step 140, it is determined if the antenna contains symmetric geometry. As described above, if there are additional sets of elements that define solid angles, and the additional sets of elements are not symmetrical (step 140=NO), then step 150 is performed. In step 150, it is determined if all solid angles have been selected. If not (step 150=NO), another solid angle is selected in step 110 and steps 120 and 130 are performed again for the non-symmetrical sets of elements. Generally, "symmetrical" means "identical." For instance, if two sets of elements are symmetrical, then the solid angle defined by each set should be identical. However, there may be situations where two sets might not be symmetrical but the solid angle defined by each set would be very similar.

If the antenna is symmetric (step 140=YES), such that each set of elements is symmetric, or all solid elements have been selected (step 150=YES) the antenna geometry is defined in step 160 in order to create the solid angles. The step of defining creates at least one set of elements and a plurality of input feeds, such that the largest element is smaller than the smallest wavelength applied to all solid angles. Additionally, the step of defining requires more than one input signal to be simultaneously transmitted via the input feeds.

There are multiple techniques for defining the antenna geometry. For instance, in step 130 the concentration may be maximized, as described in more detail below, by determining multipole coefficients that maximize the concentration in the selected solid angle. Then the antenna geometry is defined in step 160 by determining currents corresponding to the multipole coefficients and by determining antenna geometry suitable for creating the currents. In other words, the solid angles are defined and maximized through mathematics, then the antenna geometry is designed via techniques known to those skilled in the art in order to create the solid angles.

Additionally, step 160 may be performed by first selecting the antenna geometry so as to maximize the concentrations in the various solid angles. In other words, the antenna geometry is first selected and modified in order to maximize the concentrations in the solid angles.

When the antenna geometry has been sufficiently designed in order to create a compact antenna, method 100 ends in step 170.

Figure 2:
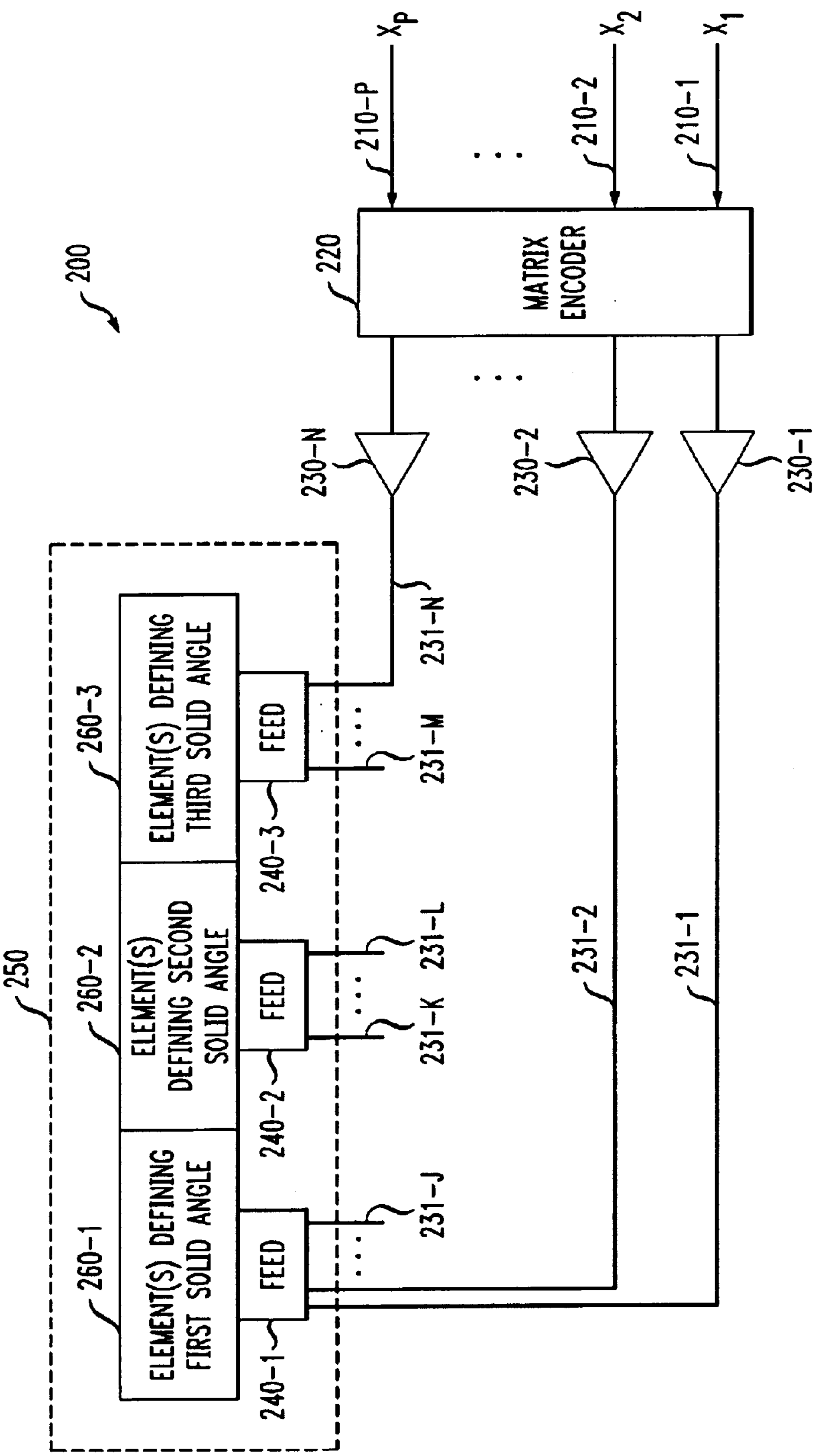
FIG. 2 is a block diagram of a communication system having a compact antenna designed by the method of FIG. 1, in accordance with a preferred embodiment of the invention.

Referring now to FIG. 2, a communication unit 200 is shown. Communication unit 200 comprises input signals 210-1 through 210-P (collectively, input signals 210), a matrix encoder 220, transmitters 230-1 through 230-N (collectively, transmitters 230) which create transmitter outputs 231-1 through 231-N (collectively, transmitter outputs 231), feeds 240-1 through 240-3 (collectively, feeds 240), and antenna 250. Antenna 250 comprises element sets 260-1 through 260-3 (collectively, sets 260), each of which comprises a number of elements that define a solid angle. In this example, transmitter outputs 231-1 through 231-J are coupled to feed 240-1; transmitter outputs 231-K through 231-L are coupled to feed 240-2; and transmitter outputs 231-M through 231-N are coupled to feed 240-3, where $1 \leqq J<K<L<M<N$.

Matrix encoder 220 accepts the input signals 210 and routes these signals to the transmitters 230. Matrix encoder 220 can also apply mathematical functions in order to combine input signals 210, if desired, and matrix encoder 220 encodes the input signals 210. Additionally, in general terms, P is not equal to N. For instance, if P is six and N is three, matrix encoder 220 can linearly combine each two of the P input signals and route the result to one of the three transmitters 230. The linear combination can be performed through a mathematical function, such as $X_i+X_{i+1}=Y_i$, where $X_i$ is the i-th input signal, $X_{i+1}$ is the (i+1)-th input signal, and $Y_i$ is the resultant signal. Similarly, the linear combination could be a non-linear combination. The non-linear combination could be performed through a mathematical function, such as $(X_i+X_{i+1})^{1/2}=Y_i$. Matrix encoder 220 may also be replaced by a single encoder per input signal 210. For instance, in a configuration such as that shown in FIG. 11 where there are two feeds 240 per set 260, there could be three input signals 210. Each input signal 210 could be routed to one of three encoders. The output of an encoder could be routed to one set of two feeds 240.

Figure 11:
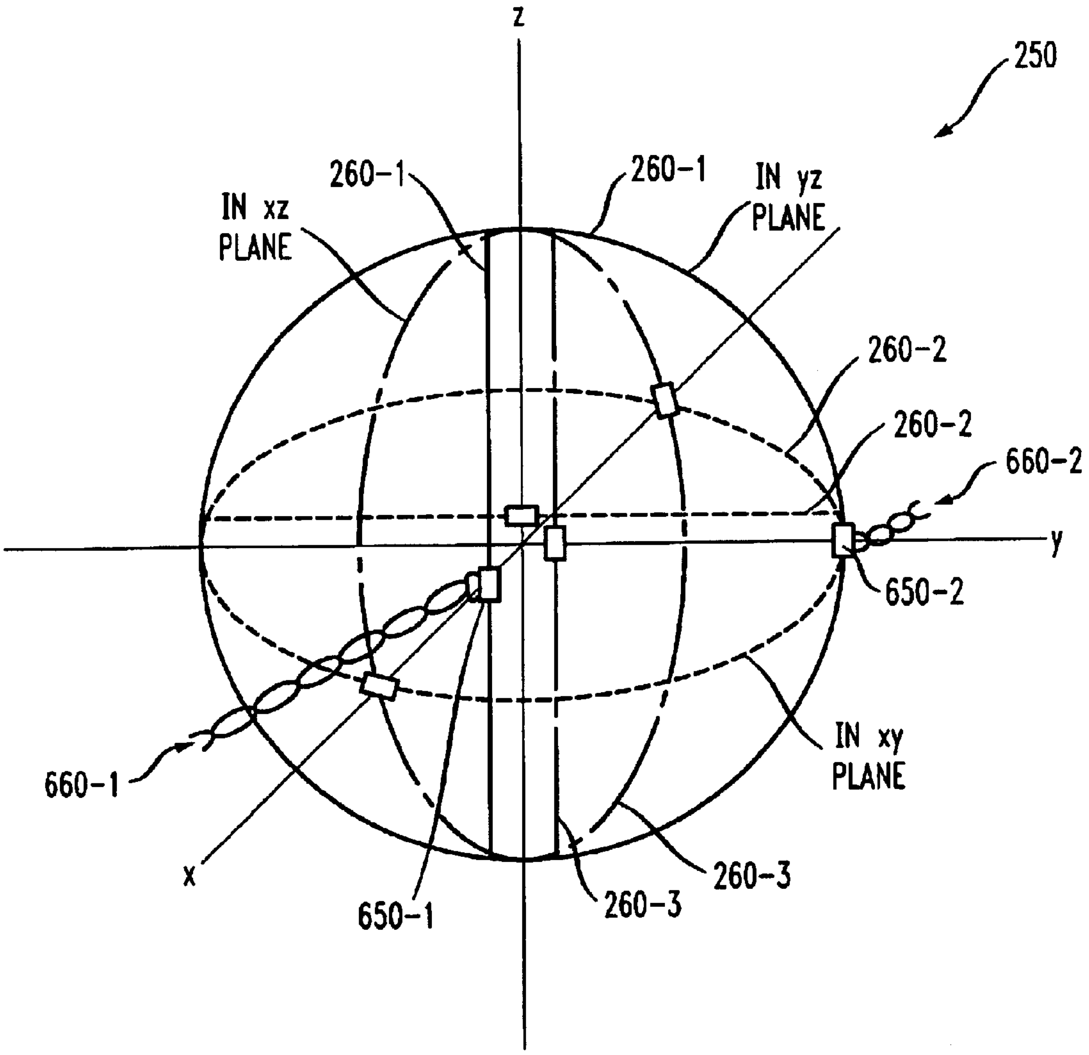
FIG. 11 shows a diagram of the antenna of FIG. 6 implemented in three dimensions, in accordance with a preferred embodiment of the invention.

Although there are three feeds 240 shown in FIG. 2, each set 260 of elements might have additional feeds, as shown in FIG. 11.

Additionally, although three sets 260 shown, there could be fewer or more sets. In particular, all feeds 240 could be used to define all concentrated regions. This is called a distributed representation. A solid angle into which power is radiated is determined by the particular pattern of currents on the feeds 240. Each distributed pattern of currents will cause the radiation to be concentrated into one of the solid angles.

To transmit, input signals 210 are applied to the matrix encoder 220, mathematical functions, if desired, are performed during combining of input signals 210, and input signals 210 are encoded and applied to transmitters 230. The mathematical functions, as previously described above, allow multiple input signals to be combined and subsequently coupled to feeds. Transmitters 230 couple their signals through feeds 240 to sets 260. Each of the sets 260 of elements are designed to cause a directed beam to be emitted. The antenna 250 is designed so that each element in the sets 260 of elements has a largest dimension. This largest dimension is smaller than the smallest wavelength emitted from the antenna 250. Additionally, during use, more than two input signals 260 are simultaneously transmitted via the plurality of input feeds 240. As described previously, a directed beam is a radiation pattern in which power is concentrated in a chosen solid angle. When the solid angle is made large enough, it is possible for the solid angle to contain multiple degrees of freedom. This means that multiple independent input signals 210 will be emitted via the directed beam with the multiple degrees of freedom.

It should be noted that FIG. 2 may also be modified to include reception apparatus. For example, matrix encoder 220 and transmitters 230 can be part of signal processing circuitry. Such signal processing circuitry can also include a matrix decoder, or a number of separate decoders, and detectors, shown, for instance, in U.S. Pat. No. 6,317,098, incorporated by reference above. In this way, communication unit 200 may be a transceiver comprising the signal processing circuitry and an antenna.

For a general localized source distribution, the time-averaged power radiated per unit solid angle is given by:

$$\frac{dP}{d\Omega} = \frac{Z_0}{2k^2}\left|\sum_{l,m}\left[a_E(l,m)\hat{n}\times\vec{X}_{lm} + a_M(l,m)\vec{X}_{lm}\right]\right|^2, \quad (1)$$

where $Z_0$ is the impedance of free space ($1/\epsilon_0 c \cong 377\Omega$), where k is the wave number $2\pi/\lambda$, where the coefficients $a_E$(l,m) and $a_M$(l,m) will be related to properties of the source in the next section, and where $X_{lm}$ are vector spherical harmonics. Vector spherical harmonics are described in additional detail in, for instance, J. Jackson, "Classical Electrodynamics," John Wiley & Sons (1998), the disclosure of which is hereby incorparated by reference.

It is noted that electric and magnetic multipoles of a given (1, m) have the same angular dependence but have polarizations at right angles to one another. Then, the concentration in the solid angle $\Omega_0$ may be defined as:

$$\lambda(\Omega_0) = \frac{\int_{\Omega_0}\frac{dP}{d\Omega}d\Omega}{\int_{4\pi}\frac{dP}{d\Omega}d\Omega}. \quad (2)$$

It is beneficial to find multipole coefficients that maximize the concentration, $\lambda(\Omega_0)$. Due to the orthogonality properties of the vector spherical harmonics, the total power radiated (i.e., the denominator of the concentration $\lambda$ above) is as follows $$\frac{dP}{d\Omega} = \frac{Z_0}{2k}\sum_{l,m}|a_E(l,m)|^2 + |a_M(l,m)|^2. \quad (3)$$

Then, maximization of Equation (2) leads to the following eigenvalue problem:

$$\Delta(\Omega_0)c = \lambda(\Omega_0)c, \quad (4)$$

where the column vector $c=[a_E(l,m),a_M(l,m)]$. $\Delta(\Omega_0)$ is the well known "interference matrix" for a given solid angle $\Omega_0$. The examples given below use spherical symmetry for an antenna. When using spherical symmetry, z is chosen to be the axis going through the center of the chosen solid angle.

It is beneficial to investigate the properties of the concentration eigenvalues as a function of the largest quantum number, L. When L=1, both $\Delta_1(\Omega_0)$ and $\Delta_2(\Omega_0)$ are diagonal matrices, and there are $$\int_{\Omega_0} \left|\vec{X}_{lm}\right|^2 d\Omega$$

elements (m=−1,0,1) on its diagonal. These elements can be computed analytically. The analytic formula for $\Delta_2(\Omega_0)$ can also be computed.

Figure 3A:
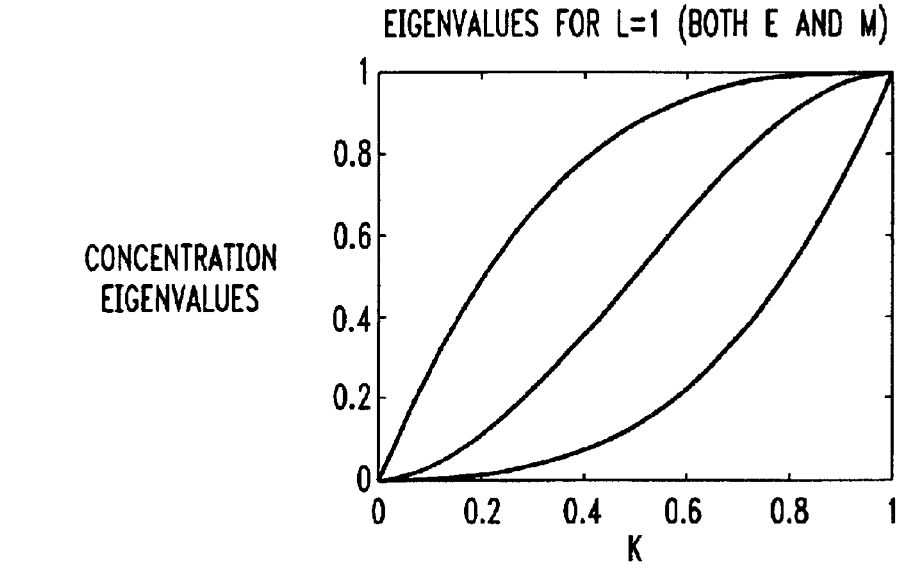
FIGS. 3A and 3B are concentration and radiation graphs, respectively, for both electric and magnetic dipoles for a quantum number of one and a specific element of an interference matrix, in accordance with a preferred embodiment of the invention.
Figure 3B:
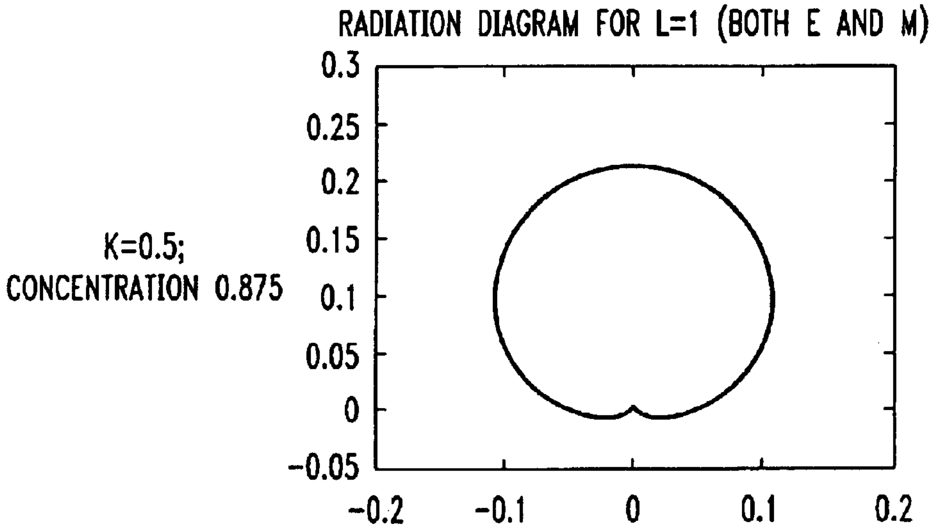

The concentration eigenvalues and radiation patterns are plotted in FIGS. 3A through 3B for an antenna having spherical symmetry. FIGS. 3A and 3B are concentration and radiation diagrams, respectively, for both electric and magnetic dipoles for a quantum number of one and a specific element of the interference matrix. The parameter K is called a beamwidth parameter and is defined as $$K = \frac{\Omega_0}{4\pi} = 0.5(1 - \cos(\theta_0)).$$

Figure 4A:
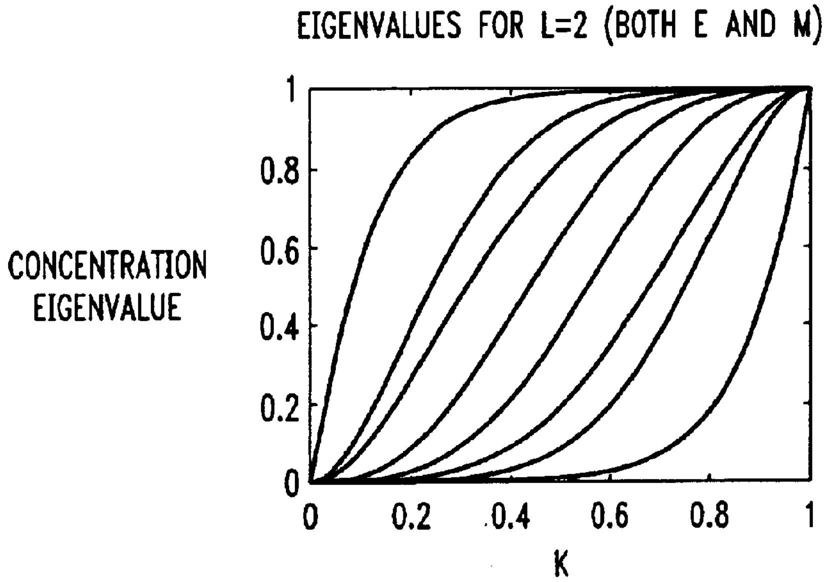
FIGS. 4A and 4B are concentration and radiation graphs, respectively, for both electric and magnetic dipoles for a quantum number of two and a specific element of an interference matrix, in accordance with a preferred embodiment of the invention.
Figure 4B:
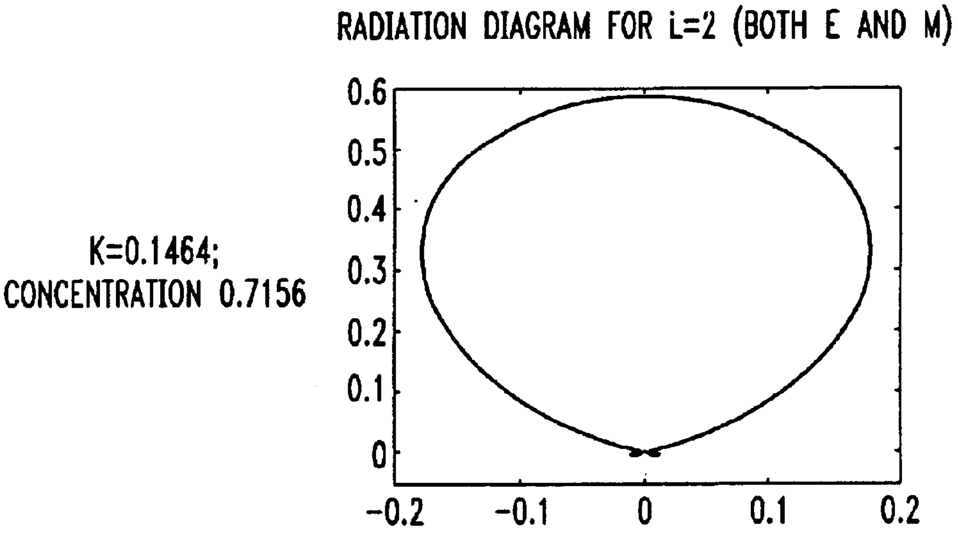

When L=2 and higher, the matrices are no longer diagonal. Although it would still be possible to obtain analytic solutions, it would be quite a time-consuming task. It is, however, possible to numerically compute these values. In the diagrams shown in FIGS. 4A through 4B, the values have been numerically computed. The concentration eigenvalues and radiation patterns are shown in FIG. 4. FIGS. 4A and 4B are concentration and radiation graphs, respectively, for both electric and magnetic dipoles for a quantum number of two and a specific element of the interference matrix.

Thus, FIGS. 3A through 3B and 4A through 4B show that it is possible to determine solutions to the eigenvalue problem of Equation (4), and these solutions can be used to maximize Equation (2).

Figure 5A:
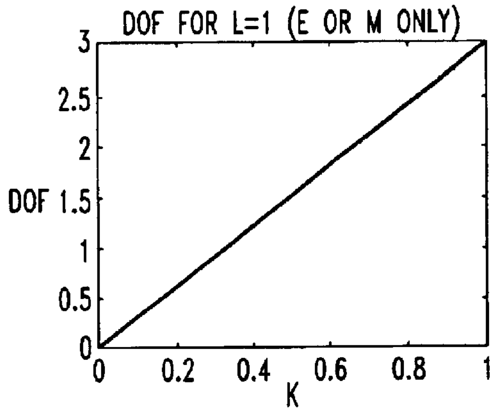
FIGS. 5A and 5B are graphs of degrees of freedom going into a chosen solid for either the electric or the magnetic dipole for a quantum number of one or two, respectively, in accordance with a preferred embodiment of the invention.
Figure 5B:
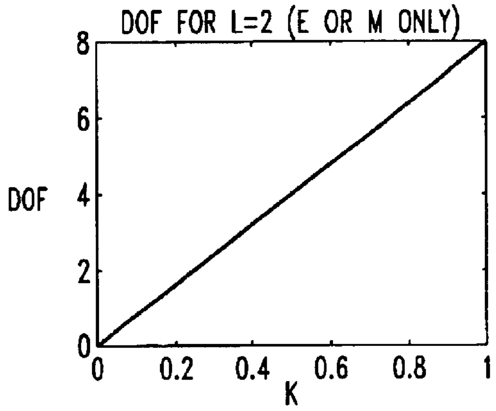
Figure 5C:
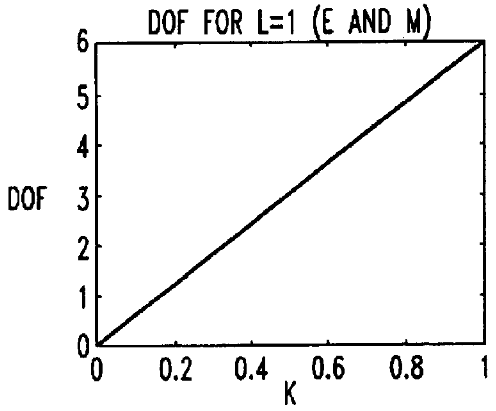
FIGS. 5C and 5D are graphs of degrees of freedom going into a chosen solid for both the electric and the magnetic dipole for a quantum number of one or two, respectively, in accordance with a preferred embodiment of the invention.
Figure 5D:
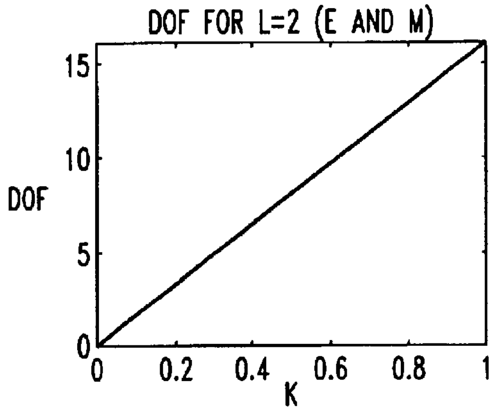

An example measure is now defined for the degrees of freedom (DOF) going into a given solid angle $\Omega_0$. Since only a few concentration eigenvalues are close to unity (i.e., approach 1), while the others nearly vanish (i.e., approach zero), DOF is defined as follows:

$$DOF = \sum_k \lambda_k, \tag{5}$$

where the sum is taken over all eigenvalues including whatever degeneracy there might be. FIGS. 5A through 5D show how this quantity varies with the largest quantum number L and the beamwidth parameter K. As described above, the beamwidth parameter K is a linear function of the size $\Omega_0$ of a solid angle. FIGS. 5A and 5B are graphs of DOF going into a chosen solid angle for either the electric or the magnetic dipole for a quantum number of one or two, respectively. FIGS. 5C and 5D are graphs of DOF going into a chosen solid for both the electric and the magnetic dipole for a quantum number of one or two. It should be noted that when the solid angle is large enough more than one degree of freedom can fit into the solid angle. This means that more than one independent input combination for a set of elements would produce an output in the solid angle defined by the set of elements, thereby leading to increased efficiency.

An exemplary compact antenna that produces a directed beam having a high concentration within a chosen solid angle is shown in FIG. 6. Antenna 600 comprises two elements 610 and 620: a straight portion 610 and a loop 620. The straight portion 610 intersects the y axis at one unit on the y axis, while the loop 620 intersects the x axis at locations two units and negative two units. Straight portion has a feed 650-1 that is coupled to wire leads 660-1. Loop 620 has a feed 650-2 that is coupled to wire leads 660-2. Generally, wire leads 660-1 and 660-2 would be coupled to the output of a single transmitter, such as transmitter 230-1 in FIG. 2. Alternatively, the wire leads 660-1 and 660-2 could be coupled to different transmitters, such as having wire leads 660-1 coupled to transmitter 230-1 in FIG. 2 and wire leads 660-2 coupled to transmitter 230-2 in FIG. 2. Antenna 600 can be excited in such a way to confine radiated power to approximately a $\frac{2}{3}\pi$ solid angle, as shown in FIGS. 7 through 9.

Each element 610, 620 has a largest dimension defined by a radiating portion of the element 610, 620. For instance, straight portion 610 has an x-dimension 640, a y-dimension 641, and a z-direction 642. The largest dimension is the z-dimension 642, which is four units. The wire leads 660-1 are not radiating portions and are therefore not considered when determining dimensions of loop 610. Similarly, loop 620 has an x-dimension 630, a y-dimension 631, and a z-direction 632. The largest dimension is either the x-dimension 630 or the z-dimension 632, both of which are four units. As before, the wire leads 660-2 are not radiating portions and are therefore not considered when determining dimensions of loop 620. Thus, the largest element of these elements has a size of four units. The smallest wavelength for this compact antenna 600 is greater than four units. In this example, if the units are meters, then element sizes 630 and 640 may be 4 meters or 0.4 meters, for instance. Corresponding minimum wavelengths are then greater than 75 MHz (megahertz) or 750 MHz, respectively.

Figure 7:
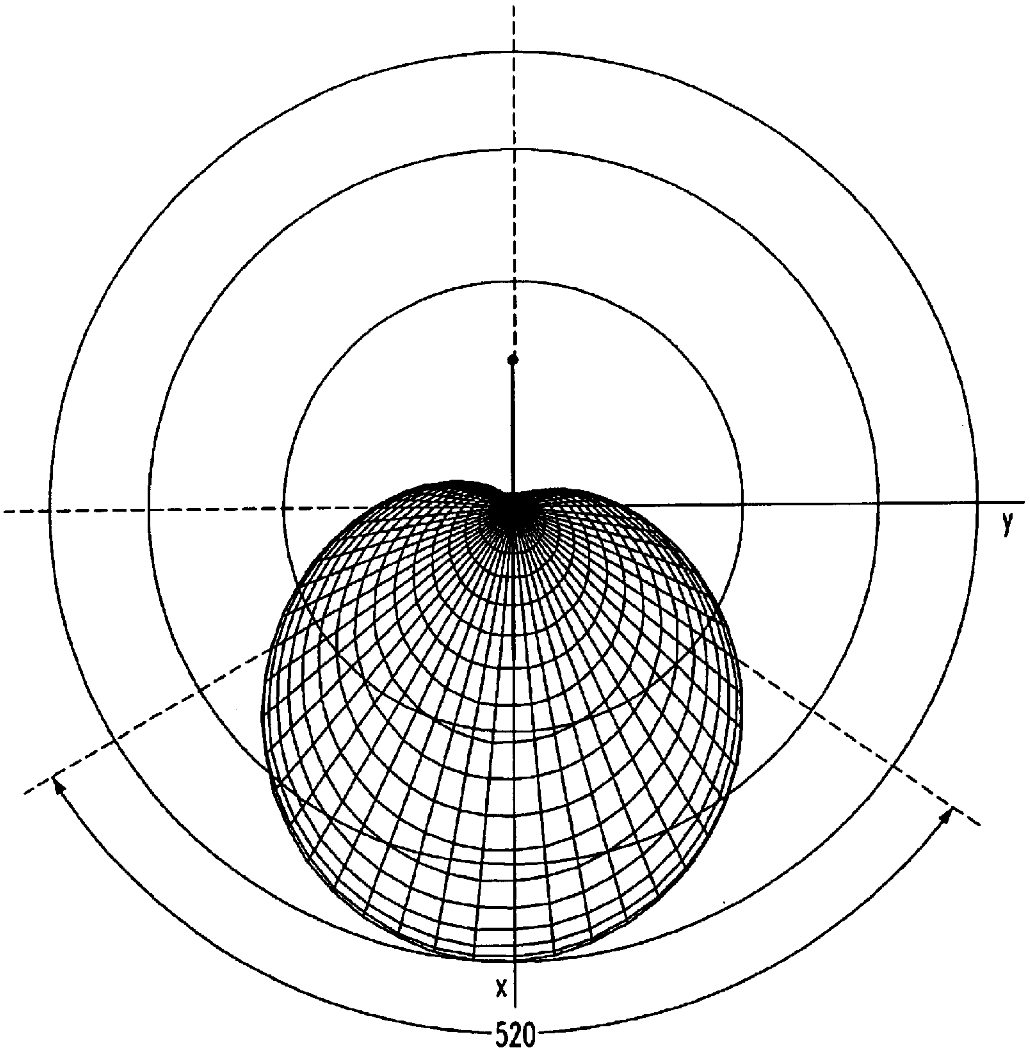
FIG. 7 is a graph of the x-y plane radiation pattern of the antenna of FIG. 6.
Figure 8:
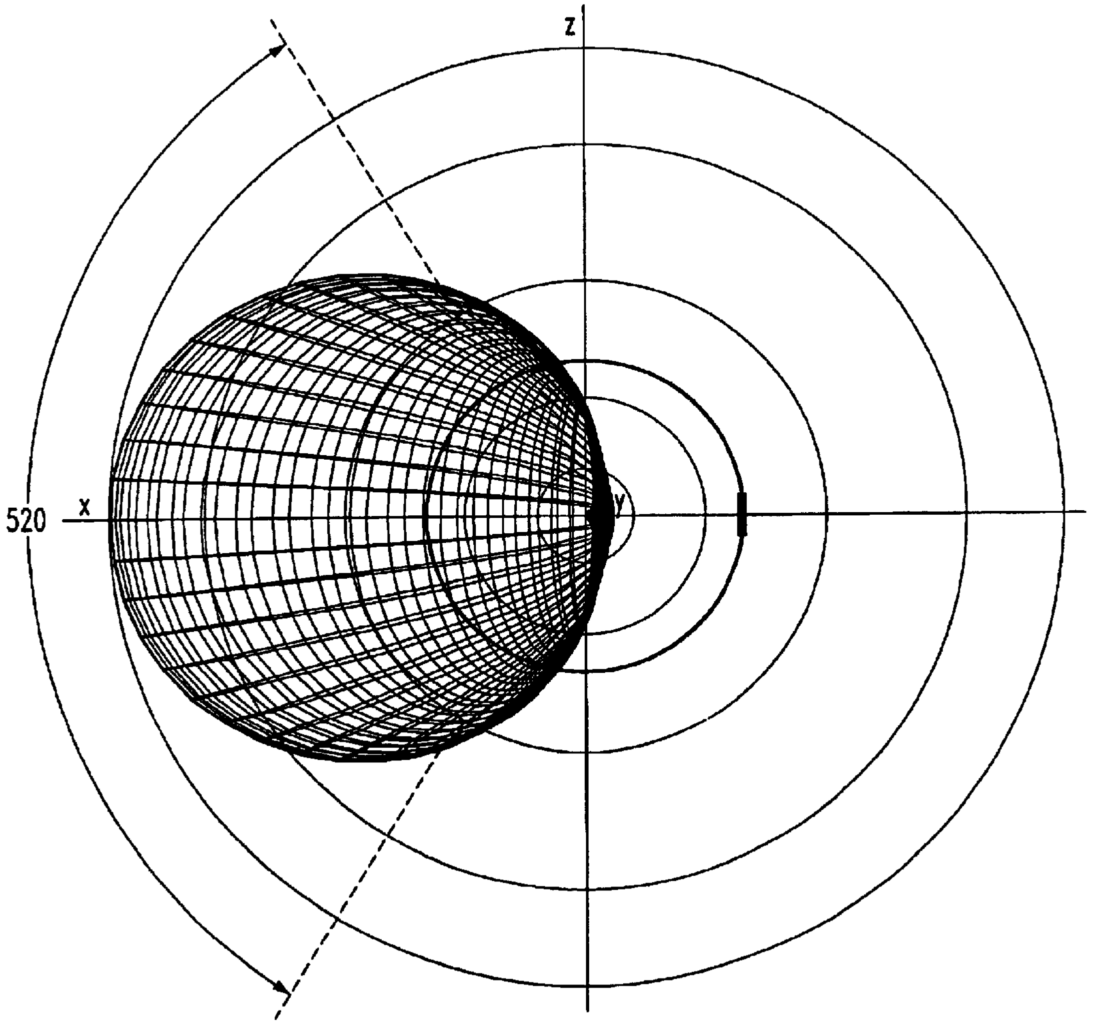
FIG. 8 is a graph of the x-z plane radiation pattern of the antenna of FIG. 6.
Figure 9:
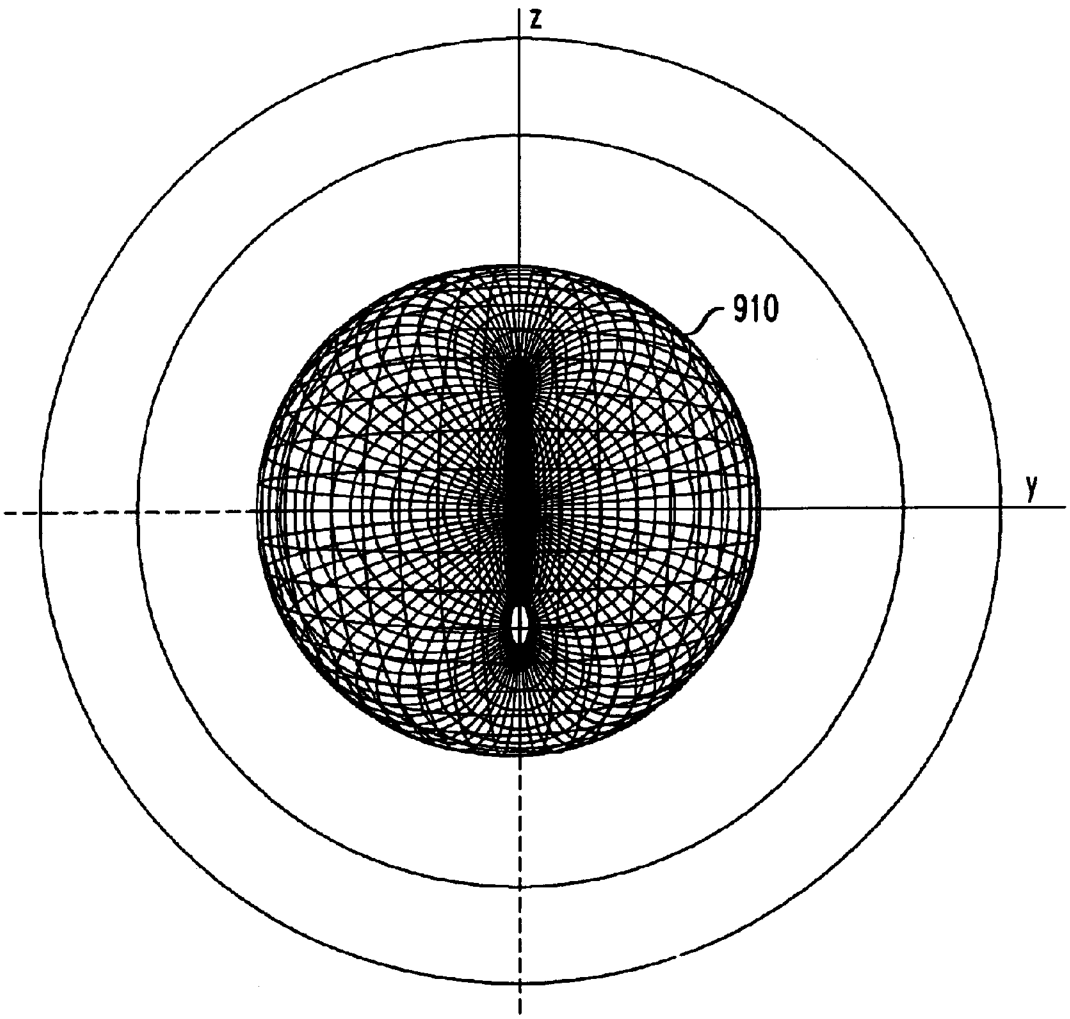
FIG. 9 is a graph of the y-z plane radiation pattern of the antenna of FIG. 6.

The corresponding radiated power for the compact antenna 600 is shown in FIG. 7 (x-y plane), FIG. 8 (x-z plane), and FIG. 9 (y-z plane). The solid angle $\Omega_0$ of 120 degrees or $\frac{2}{3}\pi$ radians, is shown on FIGS. 7 and 8. In FIG. 9, the solid angle $\Omega_0$, omitted for clarity, would be a circle that is subsumed by and is almost equivalent to outside circumference 910. Note that the concentration eigenvalue is close to the theoretical value of one. Note also that a signal radiated by the antenna 600 is radiated unequally in different directions.

Having discussed the properties of multipole fields and radiation patterns, a connection will now be described between those fields and the sources that generate them. It is beneficial to find sources that produce the types of concentrated patterns discussed above. In other words, assuming that various electric and magnetic coefficients (e.g., the $a_E(l,m)$ and $a_M(l,m)$ coefficients) are known, source (s) are to be found that can be expressed in terms of those multipole coefficients and the associated vector harmonics.

Figure 10:
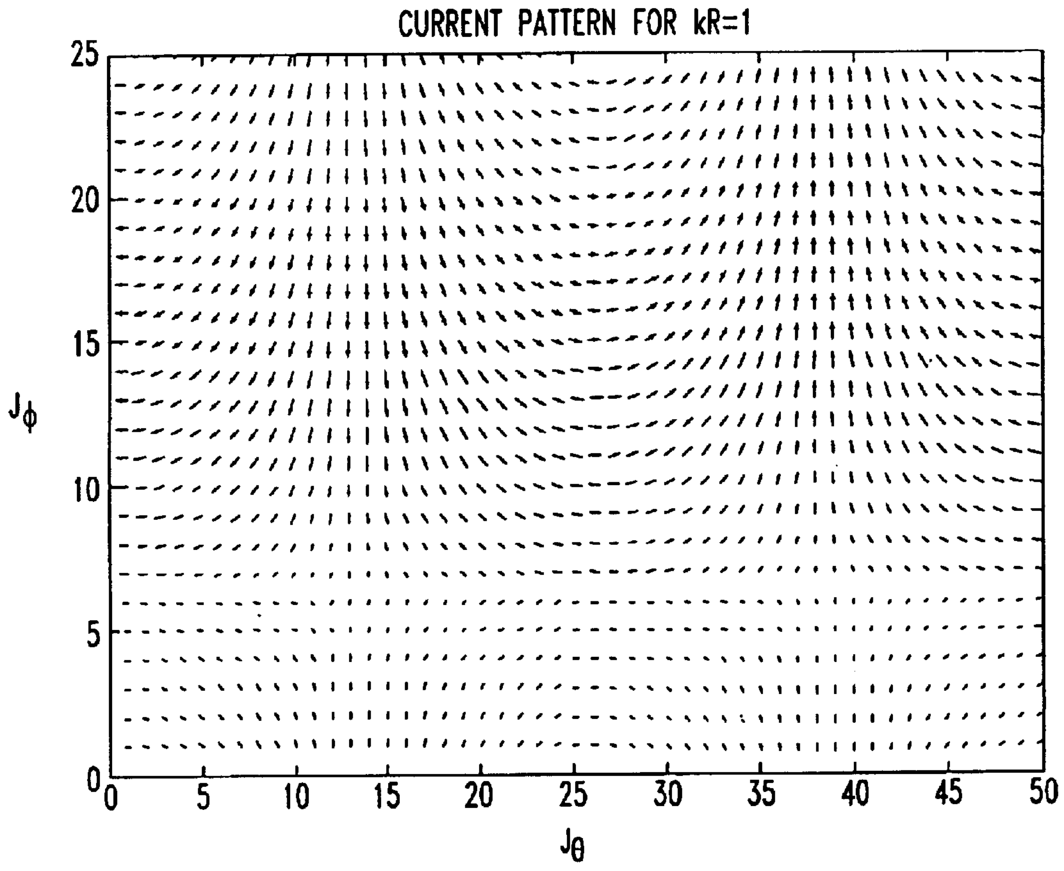
FIG. 10 is a graph of a current pattern produced on a surface of a sphere when source dimensions of a multipole antenna are equivalent to the wavelength transmitted, in accordance with a preferred embodiment of the invention.

One technique for finding a source is to determine the multipole coefficients that maximize power in a solid angle. Idealized currents corresponding to the multipole coefficients can then be determined. For instance, a current pattern is shown in FIG. 10 for a spherical shell used as an antenna. Using a least squared method, for instance, currents may be found that are close to the idealized currents. The geometry to create the currents can then be determined, where the geometry includes a particular distribution of feeds and elements.

Referring now to FIG. 12, an example of an antenna 250 is shown. Antenna 250 comprises three sets of elements 260-1 through 260-3, each of which is antenna 600 in FIG. 6. Two input leads 240 are shown for the elements comprising set 260-1.

The antenna 250 thus has three sets of elements 260-1 through 260-3, each of which defines a solid angle.

New techniques have been discussed that, among other things, focus on the amount of radiated power in a given solid angle. Some benefits of the techniques in one or more of the exemplary embodiments are as follows: (1) the techniques give a fundamental way of counting the degrees of freedom in antennae with multiple inputs/outputs; (2) the techniques allow one to design multiple degree of freedom systematically within a given solid angle; (3) the techniques suggest practical designs for current patterns, which can be converted onto the antenna geometry; and (4) having both electric and magnetic degrees of freedom can be used to produce more concentrated beams, or, for some selected concentration, to produce more degrees of freedom.

It is to be understood that the embodiments and variations shown and described herein are merely illustrative of the principles of this invention and that various modifications may be implemented by those skilled in the art without departing from the scope and spirit of the invention. For example, maximization of concentration in a solid angle can be performed by meeting a predetermined concentration, such as having the concentration be 0.8, or 80 percent of maximum concentration. In addition, the various assumptions made herein are for the purposes of simplicity and clarity of illustration, and should not be construed as requirements of the present invention.

We claim:

1. An antenna comprising:

at least one input feed; and at least one set of elements coupled to the at least one input feed, the at least one set of elements having a property that input signals applied to the at least one input feed cause at least one directed beam to be emitted, wherein at least a given element of the at least one set of elements has a largest dimension, wherein a smallest wavelength to be emitted from the antenna is larger than the largest dimension for the given element, and wherein the antenna is adapted to simultaneously transmit the input signals.

2. The antenna of claim 1, wherein the antenna is adapted to simultaneously transmit more than two input signals supplied via the at least one input feed.

3. The antenna of claim 1, wherein one or more of the at least one set of elements each comprises a single element.

4. The antenna of claim 1, wherein one or more of the at least one set of elements each comprises multiple elements.

5. The antenna of claim 1, wherein each directed beam has a property that each input signal applied to a set of elements emitting a directed beam is radiated unequally in at least two directions.

6. The antenna of claim 1, wherein each of the directed beams has a property that a solid angle of the directed beam has a ratio of power transmitted by the at least one directed beam to total power emitted by the antenna that is greater than a predetermined concentration.

7. The antenna of claim 1, wherein one or more of the directed beams have at least one degree of freedom in a concentration region.

8. The antenna of claim 7, wherein the one or more directed beams have multiple degrees of freedom in a concentration region.

9. The antenna of claim 1, wherein more than one independent combination of input signals produces output in one of the directed beams.

10. The antenna of claim 1, wherein each directed beam defines a concentration region and wherein each of the directed beams has a predetermined energy concentration in the concentration region.

11. The antenna of claim 10, wherein the concentration region is a solid angle.

12. The antenna of claim 1, wherein one or more of the at least one set of elements each comprises a loop and a straight portion.

13. A communication unit comprising:

an antenna comprising:

at least one input feed; and at least one set of elements coupled to the at least one input feed, the at least one set of elements having a property that input signals applied to the at least one input feed cause at least one directed beam to be emitted, wherein at least a given element of the at least one set of elements has a largest dimension, wherein a smallest wavelength to be emitted from the antenna is larger than the largest dimension for the given element, and wherein the antenna is adapted to simultaneously transmit the input signals; and signal processing circuitry coupled to the at least one input feed of the antenna.

14. The communication unit of claim 13, wherein the antenna is adapted to simultaneously transmit more than two input signals supplied via the at least one input feed.

15. The communication unit of claim 13, wherein the signal processing circuitry comprises at least one encoder coupled to the at least one input feed, wherein the at least one encoder is responsive to one or more applied signals and is adapted to develop the input signals based on the one or more applied signals.

16. The communication unit of claim 13, wherein the signal processing circuitry comprises at least one decoder coupled to the at least one input feed, wherein the at least one decoder is responsive to one or more signals generated by the at least one input feed and is adapted to decode the one or more signals.

17. The communication unit of claim 15, wherein the at least one encoder is a matrix encoder adapted to accept M input signals and produce N encoded signals.

18. The communication unit of claim 17, wherein the matrix encoder is adapted to linearly combine the M input signals into N output signals before encoding the N output signals to create the N encoded signals.

19. The communication unit of claim 17, wherein the matrix encoder is adapted to non-linearly combine the M input signals into N output signals before encoding the N output signals to create the N encoded signals.

20. The communication unit of claim 17, wherein the matrix encoder is adapted to encode each of the M input signals into M output signals and is adapted to combine the M output signals into the N encoded signals.

21. The communication unit of claim 15, wherein the at least one encoder comprises a plurality of encoders.

22. A method of using an antenna, comprising the steps of:

providing an antenna comprising:

at least one input feed; and at least one set of elements coupled to the at least one input feed, the at least one set of elements having a property that input signals applied to the at least one input feed cause at least one directed beam to be emitted, wherein at least a given element of the at least one set of elements has a largest dimension, wherein a smallest wavelength to be emitted from the antenna is larger than the largest dimension for the given element, and wherein the antenna is adapted to simultaneously transmit the input signals; and applying the more than two input signals to the at least one input feed so that the at least one directed beam is emitted.

23. A method for designing an antenna, comprising the steps of:

selecting a concentration region to be emitted from the antenna, the concentration region to be emitted in a directed beam;

determining concentration for the selected concentration region;

increasing concentration a predetermined amount until the concentration reaches a predetermined concentration; and defining antenna geometry in order to create the concentration region with the predetermined concentration, wherein the step of defining creates at least one set of elements and at least one input feed in the antenna geometry, wherein at least a given element of the at least one set of elements has a largest dimension, wherein a smallest wavelength to be emitted from the antenna is larger than the largest dimension for the given element, and wherein the step of defining creates an antenna adapted to simultaneously transmit the input signals.

24. The method of claim 23, wherein the concentration is a ratio of power transmitted in the selected concentration region to total power transmitted by the antenna.

25. The method of claim 23, wherein:

the step of increasing further comprises the step of maximizing concentration by determining multipole coefficients that maximize the concentration in the selected concentration region; and the step of defining antenna geometry further comprises the steps of:

determining currents corresponding to the multipole coefficients; and determining antenna geometry suitable for creating the currents.

26. The method of claim 23, wherein the step of defining antenna geometry further comprises the step of selecting antenna geometry so as to maximize the concentration in the concentration region.

* * * * *

UNITED STATES PATENT AND TRADEMARK OFFICE

CERTIFICATE OF CORRECTION

PATENT NO. : 6,809,693 B2

DATED : October 26, 2004

INVENTOR(S) : Andrews et al.

It is certified that error appears in the above-identified patent and that said Letters Patent is hereby corrected as shown below:

Title page,
Item [75], Inventors, after "Partha Pratim Mitra," replace "Summit, NJ" with -- New York, NY --.

Signed and Sealed this

Twenty-eighth Day of March, 2006

JON W. DUDAS
*Director of the United States Patent and Trademark Office*